Patented Feb. 27, 1934

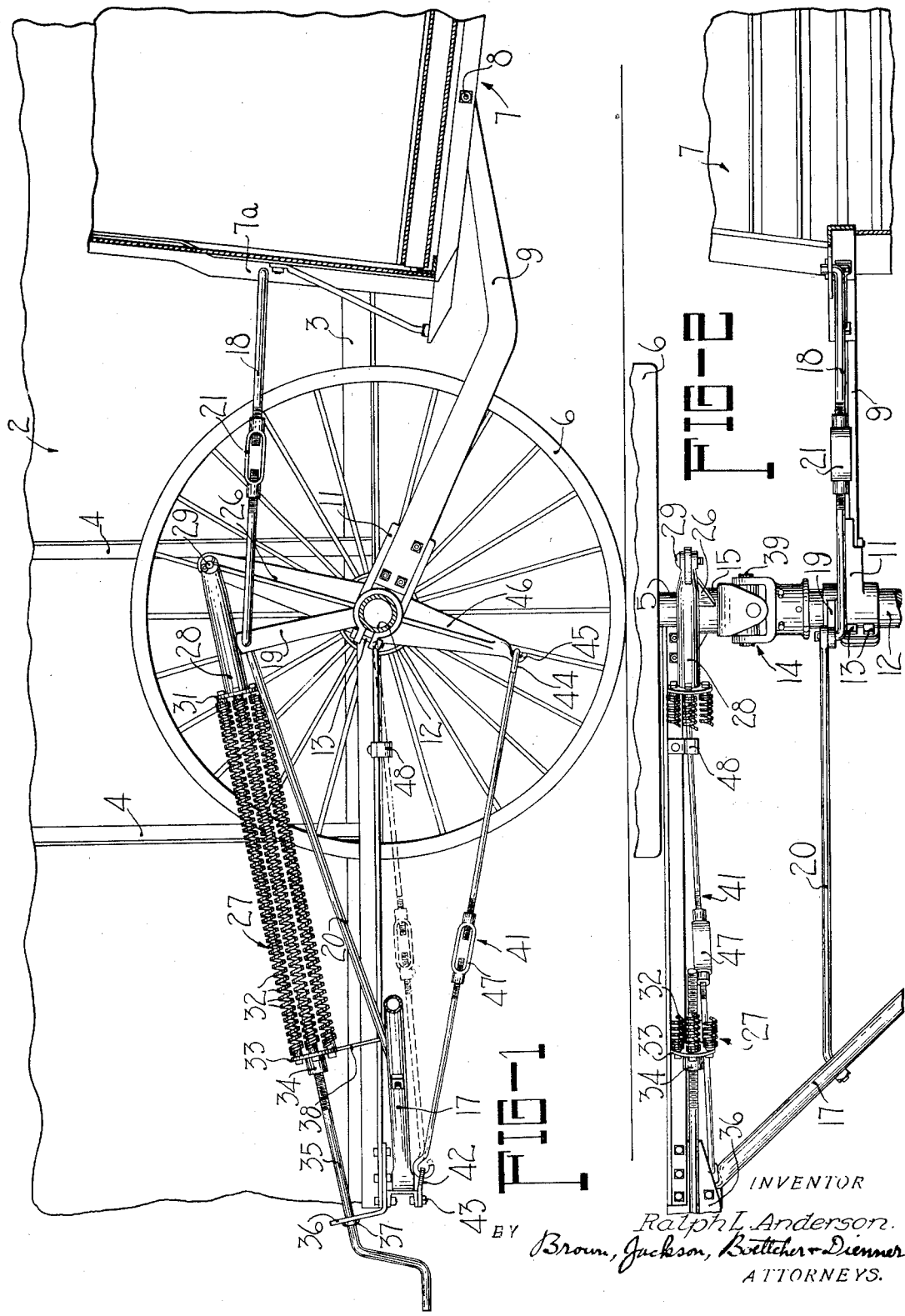

1,948,484

UNITED STATES PATENT OFFICE 1,948,484

HARVESTER

Ralph L. Anderson, Moline, Ill., assignor to Deere & Company, Moline, Ill., a corporation of Illinois Application May 22, 1933. Serial No. 672,269

8 Claims. (Cl. 56—20)

The present invention relates to harvesters of the type designed for cutting standing grain, and more particularly to such harvesters comprising a harvesters platform or frame pivotally supported for vertical movement with respect to the main frame of the machine, and in which the harvester frame with its associated parts is adapted to be disconnected from the main frame for transport purposes. As is well known to those skilled in the art, in machines of this type it is customary to provide means on the main frame for counterbalancing the weight of the harvester platform in order to keep said platform elevated the proper distance above the ground surface. Various means have been devised for accomplishing such counterbalancing, including spring mechanism, but where such spring mechanism has been employed, in all such cases so far as I am aware, it has been necessary to relieve the tension in the springs before the harvester platform is disconnected from the frame for transport purposes, which requires a separate operation and is time consuming, and is therefore objectionable for these and other reasons.

With this objection in view, the present invention has for its principal object to provide means for retaining the spring means substantially under counterbalancing tension when the harvester platform is disconnected from the main frame of the machine whereby the necessity of relieving the tension of the spring means is obviated.

In the drawing illustrating the preferred embodiment of my invention,—

Figure 1 is a fragmentary side elevational view of a combined harvester and thresher equipped with my improvements; and Figure 2 is a fragmentary top plan view of the parts shown in Figure 1.

Referring to the drawing, the thresher unit is indicated as an entirety by the numeral 2 and comprises frame members 3 and 4 carried by a transverse axle 5 supported on the usual pair of carrying wheels the inner one of which is shown and indicated by the numeral 6.

The harvester platform, indicated at 7, is pivotally supported at its opposite ends as shown at 8 on the forward ends of a pair of longitudinally extending laterally spaced arms 9, only one of which is shown in the drawing. The rear ends of the arms 9 are bolted or otherwise suitably secured to a clamping member 11 held in position on a transverse tubular frame member or axle 12 by means of bolts 13. The frame member 12 is supported at its outer end on a suitable supporting wheel (not shown) and at its opposite end is connected by means of a universal joint 14 to a suitable casting 15 fixedly secured to the inner end of the axle 5, upon which the carrying wheels 6 of the thresher are journaled, as shown in Figure 2.

The outer end of the frame member 12 is also connected to one end of a diagonal brace member 17, the opposite end of which is connected in any suitable manner with the thresher frame. The harvester platform or frame is braced by a plurality of links 18, one of which is shown in the illustrated construction. Each of the links 18 has pivotal connection at its front end with one of the vertical frame bars 7a of the harvester frame, and at its rear end with an arm 19 journaled on the frame member 12 in any suitable manner and extending upwardly therefrom. The arm 19 is also connected by a brace rod or link 20 with the diagonal frame bar 17 as shown. The brace rod 18 is formed in two sections connected together by a turn buckle 21 whereby the length of said rod may be adjusted as desired.

The casting 15 carries an upwardly extending arm 26 formed integral with the casting, and pivotally connected to the upper end of said arm is a counterbalancing spring mechanism indicated as an entirety by the numeral 27. This spring mechanism comprises a head member 28 pivotally connected at its forward end to the arm 26 by a pivot pin 29. Formed integral therewith or otherwise suitably fixed to the rear end of the head member 28 is a flange 31 to which the forward ends of a plurality of coiled springs 32 are fixedly secured in any suitable manner. The rear ends of the coiled springs 32 are fixedly secured in any suitable manner to a flange 33 of a second and movably mounted head member 34. The forward end of a crank screw 35 is threaded into a threaded boring in the head member 34, said crank screw being rotatably supported in a perforation in a bracket 36 secured to and extending upwardly from the frame of the thresher unit. The crank screw 35 is provided with an upset portion 37 as shown to prevent it from moving longitudinally with respect to the bracket 36, as will be readily understood. Consequently the tension of the springs 32 of the counterbalancing mechanism 27 may be adjusted by turning the crank screw 35 in one direction or the other as desired. To hold the head 34 against turning with the crank screw in the adjusting operation, an arm 38 or the equivalent is provided, said arm being suitably connected at its upper end with the head 34 and at its lower end with the thresher frame.

As above mentioned, in machines of this type it is customary to disconnect the harvester unit from the main frame for transporting it to and from the field, etc., and for this purpose a transport truck is usually provided for carrying the harvester platform 7 with its associated cutting and conveying mechanism and the transverse frame member or axle 12. In prior constructions with which I am familiar, wherein spring means have been used for counterbalancing the harvester, after the transport truck has been positioned under the platform 7 and the transverse member 12 and the weight of the platform loaded thereon, it has been necessary to relieve all the tension in the counterbalancing mechanism before the transverse frame member 12 could be disconnected from the main axle 5 of the thresher unit at the universal joint 14, which disconnection is ordinarily made by taking out the pin 39 of the universal joint.

By the present improved construction, however, suitable mechanism has been provided whereby it is unnecessary to relieve the tension in the spring counterbalancing mechanism in order to disconnect the universal joint mechanism, and this means will now be described. A tension member 41 is anchored at its rear end to a bracket 42 which is fixedly secured in any suitable manner to the frame of the thresher unit as by means of a bolt 43. The tension member 41 is provided with an eye 44 at its forward end which is adapted to engage over a hook 45 provided on the lower end of an arm 46 depending from and rigidly secured to or formed integral with the casting 15. The tension member 41 is formed in two sections connected together by a turnbuckle 47, as shown, whereby after the eye 44 has been disposed over the hook 45, the effective length of the member 41 can be quickly decreased to the point where the full tension in the spring counterbalancing device will be taken by the member 41, as will be readily understood. Only a slight adjustment of the turnbuckle 47 is necessary. With the parts in this position the pin 39 of the universal joint may be readily removed without difficulty for disconnecting the frame member 12 from the axle 5 after the platform 7 and frame member 12 have been loaded on the transport truck.

When the tension member 41 is not in use to hold the spring counterbalancing mechanism as above described, said member is normally carried in the position shown in dotted lines in Figure 1, the forward end thereof being supported by a bracket 48 suitably fixed to the frame of the thresher unit.

While I have illustrated what I regard to be the preferred embodiment of my invention, nevertheless it will be understood that such is merely exemplary and that numerous modifications and rearrangements of parts may be made without departing from the essence of the invention.

I also wish it to be understood that while I have illustrated and described my invention in connection with a combined harvester and thresher, the invention is not to be limited to use in such machines, as it may be used in any other implement or machine wherein counterbalancing springs are used, and the claims hereinafter made are therefore to be construed accordingly.

I claim:

1. In an agricultural implement, a main frame, a secondary frame vertically adjustable relative to the main frame and detachably connected therewith, counterbalancing spring means connected to the main frame, means for transmitting the stress of said spring to said secondary frame and counterbalancing the latter, and means for retaining said spring under stress when said force transmitting mechanism is disconnected for detaching the secondary frame from the main frame.

2. In a harvesting machine, the combination of a frame member, a vertically adjustable harvester platform detachably connected with said frame member, counterbalancing spring means, mechanism for transmitting the stress of said spring means to said platform for counterbalancing the latter, and means for retaining said spring means under stress when said force transmitting mechanism is disconnected for detaching the harvester platform from said frame member.

3. In a harvesting machine, the combination of a frame member, a vertically adjustable harvester platform detachably connected with said frame member, counterbalancing spring means mounted on said frame member, mechanism for transmitting the tension of said spring means to said platform for substantially counterbalancing the latter, said mechanism being disconnectable to permit said harvester platform to be detached from said frame member, and means for retaining said spring means substantially under counterbalancing tension when said mechanism is disconnected.

4. In an agricultural implement, a main frame, a secondary frame vertically adjustable relative to the main frame and detachably connected therewith, counterbalancing spring means connected to the main frame, means for transmitting the stress of said spring to said secondary frame and counterbalancing the latter, and an arm connected at one end with said last mentioned means and at its opposite end with said main frame for retaining said spring means under stress when said secondary frame is disconnected from the main frame.

5. In an agricultural implement, a main frame, a secondary frame vertically adjustable relative to the main frame and detachably connected therewith, counterbalancing spring means connected to the main frame, means for transmitting the stress of said spring to said secondary frame and counterbalancing the latter comprising two members detachably connected together and respectively connected with each of said frames, and means adapted to be connected at one end to one of said members and at its opposite end to said main frame for retaining said spring means under stress when said two members are disconnected for detaching the secondary frame from the main frame.

6. In an agricultural implement, a main frame, a secondary frame vertically adjustable relative to the main frame and detachably connected therewith, counterbalancing spring means connected to the main frame, means for transmitting the stress of said spring to said secondary frame and counterbalancing the latter, said means comprising a member connected to said main frame and a second member detachably connected with said first member and also connected with said secondary frame, and an arm connected at one end with said first mentioned member and at its opposite end with said main frame for retaining said spring means under stress when said stress transmitting means is disconnected for detaching the secondary frame from the main frame.

7. In an agricultural implement, a main frame, a secondary frame vertically adjustable relative to the main frame and detachably connected therewith, counterbalancing spring means connected to the main frame, means for transmitting the stress of said spring to said secondary frame and counterbalancing the latter, and means for retaining said spring under stress when said stress transmitting means is disconnected for detaching the secondary frame from the main frame, said means comprising an arm connected at one end with said last mentioned means, and a link connecting the opposite end of said arm with said main frame.

8. In an agricultural implement, a main frame, a secondary frame vertically adjustable relative to the main frame and detachably connected therewith, counterbalancing spring means connected to the main frame, means for transmitting the stress of said spring to said secondary frame and counterbalancing the latter, and means for retaining said spring under stress when said force transmitting mechanism is disconnected for detaching the secondary frame from the main frame, said means comprising an arm connected at one end with said last mentioned means, a link connecting the opposite end of said arm with said main frame, and means for varying the effective length of said link whereby the full tension in the counterbalancing spring means may be resisted.

RALPH L. ANDERSON.